United States Patent [19]
Gutierrez et al.

[11] 3,892,787
[45] July 1, 1975

[54] PROCESS FOR THE PREPARATION OF METHYL ESTERS

[75] Inventors: Eddie N. Gutierrez, Fort Lee; Robert C. Reardon, Jr., Tenafly, both of N.J.

[73] Assignee: Lever Brothers Company, New York, N.Y.

[22] Filed: Dec. 20, 1973

[21] Appl. No.: 426,770

[52] U.S. Cl....... 260/410.9 R; 260/408; 260/476 R; 260/484 R; 260/485 R; 260/487; 260/495
[51] Int. Cl............................................. C07c 67/00
[58] Field of Search ......... 260/410.9 R, 495, 488 F, 260/476 R, 485 R, 484 R, 487 R

[56] References Cited
UNITED STATES PATENTS

| | | | |
|---|---|---|---|
| 2,444,924 | 7/1948 | Farkas et al. | 260/495 |
| 3,280,173 | 10/1966 | Brill et al. | 260/475 |

*Primary Examiner*—Donald G. Daus
*Assistant Examiner*—Diana G. Rivers
*Attorney, Agent, or Firm*—Kenneth F. Dusyn; Arnold Grant

[57] ABSTRACT

A method is disclosed wherein methyl esters of mono and polyhydric alcohols are obtained by reacting said alcohols in the presence of chlorine and methanol.

6 Claims, No Drawings

PROCESS FOR THE PREPARATION OF METHYL ESTERS

BACKGROUND OF THE INVENTION

Field of the Invention

This invention pertains to a new and improved method for the preparation of methyl esters of mono and polyhydric alcohols. The method for preparing these esters may be illustrated as follows:

$$RCH_2OH + Cl_2 + CH_3OH \rightarrow RCOOMe$$

DESCRIPTION OF THE PRIOR ART

The prior art generally describes the oxidation of primary alcohols by use of bromine, bromine plus bromate, bromine plus $HNO_3$, all in aqueous media, to form the corresponding ester, i.e., if one starts with ethyl alcohol the ester obtained is ethyl acetate. When chlorine was used as the oxidizing agent, the resultant product was an alkyl hypochlorite which subsequently decomposed to the aldehyde and thus oxidized to the ester corresponding to the starting alcohol.

Previous attempts to oxidize alcohols can be illustrated by reference to the following pertinent art.

"Oxidation of Organic Compounds," Vol. II (pp 389-394), Lutz, discloses the oxidation of alcohols to acids and esters via a catalyst system based on bromine and nitric acid. No oxidation is obtained when either catalyst component is used independently or when chlorine is substituted for bromine. Poor yields and a mixture of products is obtained when low molecular weight alcohols are used.

Chattaway, et al "The Chlorination of Ethyl Alcohol," pp 1097-1101, discusses the complete course of reactions of ethyl alcohol and chlorine to form chloral. The object of this disclosure is to follow the reaction sequence as the ultimate product (chloral) is formed. There is no ester formed.

Swain et al, JACS Vol. 83, pp 1945-1950, discloses the reaction of a secondary alcohol with bromine in aqueous solution. The products obtained are ketones.

Farkas et al, JACS 71, pp 2827-2828, disclose the formation of esters of the corresponding primary alcohols when said alcohols are oxidized by bromine in the presence of bromate in aqueous solution. The reaction is conducted under highly acidic conditions. Levit et al, JACS Vol. 77 pp 4517-4521, disclose the oxidation of primary alcohol with HOCl and the subsequent production of aldehydes.

DESCRIPTION OF THE INVENTION

This invention, as previously stated, relates to a novel method for the preparation of methyl esters of mono and polyhydric aliphatic primary alcohols. The instant process differs from those heretofore in that the reaction takes place in a medium composed of chlorine, methanol and, of course, the aliphatic primary alcohol to be oxidized. The reaction is conducted at conditions of ordinary temperature and pressure.

One of the advantages of this method over those of the prior art is that chlorine is a more efficient oxidizing agent than bromine. Reactions using bromine require water and lengthy reaction times. In some cases bromine must be used with a catalyst in order to oxidize. Usually half of the alcohol is consumed in the esterification step, so that the yield of product based on the amount of alcohol used is about 50%. Use of methanol as a solvent increases the yields in some cases to well over 90% based on alcohol. When alcohols are chlorinated, e.g., ethanol without the use of methanol, the products consist mainly of EtOCl and chlorinated acetals of acetaldehyde, e.g.

$$\underset{Cl}{CH_2}CH(OEt)_2,$$

while the use of methanol as a solvent produces mainly methyl esters with small amounts of chlorinated acetals. Stated succintly, it is a critical feature of the instant process that both chlorine and methanol be present.

The ratio of methanol to primary alcohol is at least about 5:1. The amount of chlorine used is at least 0.1 mole per mole of primary aliphatic alcohol.

The methanol used in the esterification step is resistant to oxidation at room temperature by $Cl_2$, i.e., methanol does not oxidize to methyl formate.

The method consists of bubbling chlorine gas through a methanol solution of the alcohol at room temperature and atmospheric pressure. No special apparatus is needed except for the careful control of chlorine gas and stirring. Reaction times are short and the resultant products are of high purity mixed esters.

Accordingly, it is an object of this invention to provide a process for the preparation of methyl esters of aliphatic primary alcohols which comprises treating mono and polyhydric aliphatic primary alcohols with chlorine in methanol wherein said primary alcohols are selected from compounds of the formula:

$$R_1OH \text{ and } HO-R_2-OH$$

wherein $R_1$ is a straight or branched chain alkyl group of from 2 to 20 carbon atoms, phenyl, arylalkyl and alkylaryl wherein the alkyl moiety is from 1 to 20 carbon atoms and $R_2$ is an alkylene group of at least 3 carbon atoms; $R_1$ may also have halogen substituted thereon, said halogen being selected from the group consisting of chlorine, bromine, and iodine; said treatment is conducted at a temperature of from about 0°C to about 80°C wherein the ratio of methanol to aliphatic primary alcohol is from about 5:1 to about 20:1 and the ratio of chlorine to methanol is from about 0.1:1 to about 10:1.

It is a further object of this invention to obtain methyl esters in a high yield and at a high level of purity under relatively mild reaction conditions in a one-step process.

It is also a further object of this invention to provide a more economical and feasible method for the preparation of compounds which find uses as solvents, perfume fragrances, constituents of paint removers, drilling oils and textile aids, intermediates for surfactant preparations.

The novel process may be illustrated by the following equation:

$$RCH_2OH + Cl_2 + CH_3OH \longrightarrow R-\overset{\overset{O}{\|}}{C}-OMe$$

While we do not wish to be bound by any particular theory, it is our belief that the following reaction sequence is occurring:

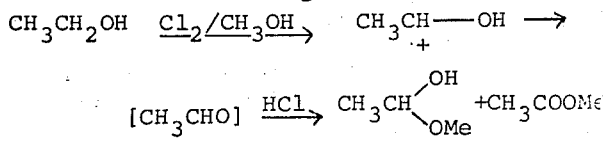

The initial oxidation produces its own catalyst so that hemiacetal formation can occur. In short, the oxidation of ethanol in $Cl_2/CH_3OH$ at room temperature results in a high yield of methyl acetate. The mechanism is believed to be a proton abstraction to form a carbonium ion which collapses to acetaldehyde, although we do not wish to be bound by such.

Where the alcohol to be oxidized is a polyhydric alcohol, it is necessary that the hydroxyl groups be separated by at least 3 carbons, i.e., 3 alkylene groups, in order for oxidation to occur. When ethylene glycol was used as the primary aliphatic alcohol, very small amounts of the glycolate were obtained, i.e., about 5%, by the instant process.

The primary aliphatic monohydric alcohols that may be used in the instant process cover a rather wide spectrum. They may be selected from compounds of the formula:

$$R_1-OH$$

wherein $R_1$ is a straight or branched chain alkyl group of from 2 to 20 carbon atoms, phenyl, alkylaryl, arylalkyl wherein the alkyl moiety is from 1 to 20 carbon atoms, $R_1$ may also be substituted with chlorine, bromine or iodine. Typical compounds that may be treated by the instant process are ethanol, isopropanol, n-butanol, n-pentanol, n-hexanol, n-heptanol, n-octanol, n-nonanol, n-decanol, n-undecanol, n-dodecanol, n-tridecanol, n-tetradecanol, n-pentadecanol, n-hexadecanol, n-heptadecanol, n-octadecanol, n-nonadecanol, n-eicosanol, 2-methyl propanol, 2-methyl butanol. The primary and secondary isomeric varieties of the above-mentioned alcohols are within the scope of this disclosure, e.g., 2-butanol, 3-pentanol, etc.

The polyhydric alcohol usable in the instant invention are those conforming to the formula:

$$HO-R_2-OH$$

wherein $R_2$ is an alkylene group of at least 3 carbon atoms. $R_2$ may be a straight chain alkylene group of from 3 to 20 carbon atoms. Examples of compounds in this category are 1,3-propane diol, 1,4-butanediol, 1,5-pentanediol, 1,6-hexanediol, 2-methyl-1,3-propanediol and the like.

The solvent, as previously stated, must be one that is resistant to oxidation by chlorine at room temperature, viz., methanol. The ratio of the methanol to the alcohol being oxidized must be at least about 5:1, preferably from about 5:1 to about 20:1, most preferably from about 5:1 to about 10:1.

The chlorine must be present at a level of about 0.1 mole per mole of methanol, preferably from about 0.1:1 to about 10:1, and most preferably from about 1:1 to about 5:1.

Although the process of the instant invention is preferably carried out at ordinary conditions temperature and pressure, a wide range of temperatures and pressures is contemplated, i.e., from about 0°C to about 80°C, preferably from about 20°C to about 40°C and most preferably from about 25°C to about 30°C and from about 1 to about 10 atmospheres of pressure.

The following Examples are intended to be illustrative and in no way are to be construed as limiting the invention.

EXAMPLE 1

This example and those that follow are accomplished by bubbling chlorine gas through a methanol solution of the alcohol at room temperature and atmospheric pressure. All the reactions are conducted in a 250 ml 3 necked flask with moderate agitation.

Into a 250 ml, 3 neck flask equipment with a mechanical stirrer is placed 5.0 grams (0.1 mole) ethanol and 80 mls methanol. Chlorine is introduced slowly. Samples are removed for NMR analysis every 10 minutes. A total of 0.23 moles of $Cl_2$ is used. The triplet centered at 1.14$\delta$ for ethanol disappeared and was replaced by a singlet at 1.87 (methanol as a solvent). Because of the low boiling point of methyl acetate (about 57°C) it could not be conventionally separated from methanol.

EXAMPLE 2

Into a 250 ml, 3 neck flask equipped with a mechanical stirrer there is placed 0.1 mole trimethylene glycol and 100 mls methanol. After 0.2 mole of $Cl_2$ has been added, the reaction mixture consisted of starting glycol and methyl hydracrylate.

Trimethylene glycol $HOCH_2CH_2CH_2OH$ consists of a quintet centered at 1.84$\delta$ and a triplet (for the $CH_2OH$) at 3.70 (in $D_2O$).

Methyl hydracrylate $HOCH_2^{(c)}CH_2^{(a)}COOCH_3^{(b)}$ consists of a triplet at 2.55 for the $CH_2(a)$, 3.67$\delta$ for the $CH_3(b)$ and a multiplet from 3.6–4.06$\delta$. The yield of methyl hydracrylate is 10 grams (96% yield).

EXAMPLE 3

Into a 250 ml, 3 neck flask, there is placed 0.1 mole β-hydroxymethyl isobutyrate and 80 mls methanol. After 0.3 moles of $Cl_2$ has been added, 2-methyl dimethyl malonate was found in a quantitative yield of 11 gms (94% yield).

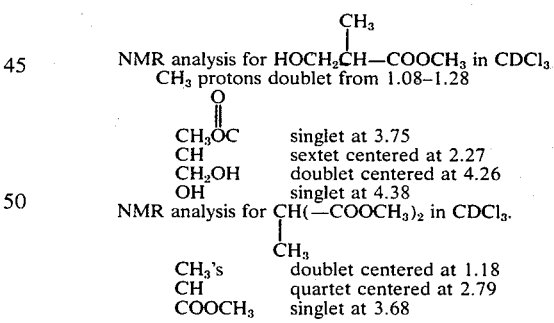

EXAMPLE 4

Into a 250 ml, 3 neck flask equipped with mechanical stirrer there is placed 0.1 mole tetramethylene glycol (1,4-butanediol) and 120 mls methanol. Then, 0.2 mole $Cl_2$ is bubbled through the solution. NMR at this point confirmed the presence of both butyrolactone and dimethyl succinate. After 0.5 mole $Cl_2$ has been added, the reaction mixture is analyzed via GLC: 45.0% dimethyl succinate, 8% butyrolactone and 8% $ClCH_2CH_2CH_2COOMe$. The retention times were compared to those of authentic samples.

The most outstanding peaks in the NMR were for dimethyl succinate: the CH₂ peak at 2.45δ and the

at 3.48δ in a 6.4 ratio. A total of 4 grams, comprising the above products was obtained.

EXAMPLE 5

Into a 250 ml, 3 neck flask equipped with mechanical stirrer, there is placed 0.1 mole chlorobutanol and 80 mls methanol. 0.14 moles of Cl₂ gas is bubbled through and then the methanol is removed under vacuum. GLC is compared to an authentic sample and found to be identical therewith. The yield of 4-chloromethylbutanoate is 93%.

EXAMPLE 6

Into a 250 ml, 3 neck flask equipped with stirrer, there is placed 0.1 mole decanol and 100 mls methanol. After 0.2 mole Cl₂ was bubbled through, removed the methanol under vacuum and analyzed via NMR and GLC.

The retention time was compared to an authentic sample of methyl decanoate.

NMR showed a peak for the

at 3.64δ, a triplet centered at 2.3δ for the

and the long chain protons CH(CH₂)₇ from 0.6–1.9δ. The yield of methyl decanoate is (about 50%).

EXAMPLE 7

Into a 250 ml, 3 neck flask, equipped with mechanical stirrer, there is placed 0.05 moles benzyl alcohol and 60 mls methanol. Bubbled through 0.25 moles chlorine and removed the solvent under vacuum. GLC analyzed for 22% benzaldehyde, 72% methyl benzoate and 3% benzyl alcohol compared to the retention times of authentic compounds and found to be identical therewith.

EXAMPLE 8

Into a 250 ml, 3 neck flask is placed 13.6 gm (0.1 mole) of 3-phenyl-1-propanol and 100 ml of methanol. The solution is chlorinated with a total of 64 gms (0.91 moles) chlorine. The methanol is distilled, leaving 16 gms (97%) yield of

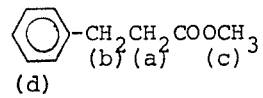

CH₂(a) multiplet 2.5–2.85δ
CH₂(b) multiplet 2.85–3.20δ
CH₃(c) singlet 3.62δ
phenyl (d) singlet 7.0–7.4

What is claimed is:

1. A process for the preparation of methyl esters of aliphatic primary alcohols which comprises treating mono and polyhydric aliphatic primary alcohols with chlorine in methanol wherein said primary alcohols are selected from compounds of the formula:

R₁OH and HO—R₂—OH wherein R₁ is a straight or branched chain alkyl group of from 2 to 20 carbon atoms, and phenylalkyl wherein the alkyl moiety is from 1 to 20 carbon atoms, and R₂ is an alkylene group of from 3 to 20 carbon atoms; R₁ may also have halogen substituted thereon said halogen being selected from the group consisting of chlorine, bromine, and iodine; said treatment is conducted at a temperature of from about 0°C to about 80°C wherein the ratio of methanol to aliphatic primary alcohol is from about 5:1 to about 20:1 and the ratio of chlorine to methanol is from about 0.1:1 to about 10:1.

2. A process according to claim 1 wherein the aliphatic primary alcohols are monohydric alcohols selected from the group consisting of ethanol, butanol, pentanol, decanol, dodecanol, pentadecanol, eicosanol.

3. A process according to claim 1 wherein the aliphatic primary alcohols are polyhydric alcohols selected from the group consisting of 1,3-propanediol, 1,4-butanediol, 1,5-pentanediol, 1,6-hexanediol, 2-methyl-1,3-propanediol.

4. A process according to claim 1 wherein the ratio of chlorine to methanol ranges from about 1:1 to about 5:1.

5. A process according to claim 1 wherein the ratio of methanol to said aliphatic primary alcohol is from about 5:1 to about 10:1.

6. A process according to claim 1 wherein the reaction temperature is from about 20°C to about 40°C.

* * * * *